United States Patent Office 2,750,357
Patented June 12, 1956

2,750,357

IMPROVEMENTS IN THE PRODUCTION OF POLYMERISATION PRODUCTS USING ACCELERATORS CONTAINING AT LEAST ONE AMINO-METHYL SULFONE GROUP

Hellmut Bredereck and Erich Bäder, Stuttgart, Germany, assignors to Deutsche Gold- und Silber-Scheideanstalt vormals Roessler, Frankfurt am Main, Germany, a body corporate of Germany, and W. C. Heraeus G. m. b. H., Hanau (Main), Germany, a body corporate of Germany No Drawing. Application July 17, 1951,
Serial No. 237,307

Claims priority, application Germany July 17, 1950

16 Claims. (Cl. 260—77.5)

This invention relates to a process for the production of polymerisation products.

It has already been known for a long time to polymerise unsaturated organic compounds, such as unsaturated hydrocarbons, vinyl compounds, acrylic compounds, styrene or allyl compounds. Catalysts are employed in these polymerisation processes to reduce the polymerisation temperature and to increase the polymerisation velocity. The use of oxygen, air, inorganic and organic per-compounds, is generally known and usual.

French specification No. 883,679 describes a process for the production of plastics, which are self-hardening at low temperatures, in which vinyl compounds, for example styrene, vinyl chloride, acrylic or methacrylic acid or derivatives thereof, are polymerised alone or in admixture with one another, in the presence of compounds which are capable of forming labile amine oxides. Amines, for example trialkyl amines, triaryl amines and triarylalkyl amines and derivatives of hydrazines, are principally proposed as suitable for the purpose. These nitrogen-containing compounds can be employed alone or in the presence of known oxygen-containing polymerisation catalysts, especially inorganic or organic peroxides.

It has now been found that the polymerisation of polymerisable organic compounds with a doubly linked terminal methylene group can be carried out particularly quickly and at particularly low temperatures by employing as polymerisation accelerators compounds of the general formula:

R—SO₂—CHR'—X in which R represents a hydrocarbon radical, R' represents hydrogen or a hydrocarbon radical, which may if desired be substituted, and X represents one of the radicals —NR'R" or OR''', in which R" represents hydrogen, OH, NHR' or a hydrocarbon radical, which may if desired be substituted, and R''' is hydrogen, alkyl, aralkyl or acyl.

The polymerisation process of the invention can be applied to the most varied polymerisable organic compounds with a doubly linked terminal methylene group. It may be applied in particular to the following polymerisable substances: unsaturated hydrocarbons of aliphatic nature, for example butadiene, vinyl acetylene or derivatives thereof, for example chlorobutadiene, or unsaturated hydrocarbons of an aromatic nature, for example styrene or divinyl benzene, derivatives of vinyl alcohol, for example vinyl chloride and other vinyl esters or vinyl ethers, acrylic acid or alkyl acrylic acids, for example methacrylic acid or derivatives thereof, for example amines, nitriles, chlorides and other esters or ethers, allyl compounds, such as diallyl diglycol carbonate or triallyl cyanurate.

Numerous amines, polyamines, hydroxylamine derivatives, hydrazines and carbinols can be employed as poly- merisation accelerators according to the invention, these compounds all having the common feature that they can be regarded as sulphones which have a mobile hydrogen atom which is adjacent to the sulphone group. This mobile hydrogen atom is linked to the group CR', as may be seen from the general formula given above. The accelerators are generally produced from sulphinic acids.

Use may be made with particular success of amines of the type of aryl-sulphone-alkyl-amines or aryl-sulphone-alkanol-amines, in which at least one of the hydrogen atoms on the nitrogen atom is replaced by a residue of the general formula

R'—C₆H₄—SO₂—CHR'— in which R' represents hydrogen, or a hydrocarbon radical, which may if desired be substituted, for example secondary or tertiary benzene- or p-toluene-sulphone-methyl-alkyl(aryl)-amine of the general formula

R'—C₆H₄—SO₂—CH₂—NR'R"

such as benzene- or p-toluene-sulphone-methyl-(phenyl)- or (ethyl-phenyl)-amine of the formula

C₆H₅—SO₂—CH₂—NH—C₆H₅

C₆H₅—SO₂—CH₂—N(C₂H₅)—C₆H₅

CH₃—C₆H₄—SO₂—CH₂—NH—C₆H₅ or

CH₃—C₆H₄—SO₂—CH₂—N(C₂H₅)—C₆H₅

Amines can be used which are substituted by the aryl-sulphone-alkyl radical and by one or two aryl groups or by an aryl- and an alkyl residue.

Amines employed as polymerisation accelerators can also contain 2 radicals of the general formula

R'—C₆H₄—SO₂—CHR'— like the compounds (H₃C—C₆H₄—SO₂—CH₂)₂NCH₃

(H₃C—C₆H₄—SO₂—CH₂)₂NH or the corresponding ethyl compound.

The amino hydrogen atoms, in addition to being substituted by the aryl-sulphone-alkyl radicals, can also be substituted by an alkanol radical, for example the ethanol residue as in the following compound (H₃C—C₆H₄—SO₂—CH₂)₂N—C₂H₄—OH Whereas the compounds mentioned above may be regarded as derived from ammonia, catalysts can also be used in the process of the invention which are derived from hydrazines, and in which at least one hydrogen atom is substituted by the above-mentioned aryl-sulphone-alkyl radical

H₃C—C₆H₄—SO₂—CH₂—NH—
                             NH—CH₂—SO₂—C₆H₄—CH₃

Finally compounds can also be employed which are substituted in the nitrogen atom both by the aryl-sulphone-alkyl radical and also by complicated radicals, which may if desired themselves contain nitrogen and aryl-sulphone-alkyl radicals, like the following derivatives of ethylene diamine H₃C—C₆H₄—SO₂—CH₂—NH—CH₂—
                      CH₂—NH—CH₂—SO₂—C₆H₄—CH₃
and (H₃C—C₆H₄—SO₂—CH₂)₂N—CH₂—
                      CH₂—N(CH₂—SO₂—C₆H₄—CH₃)₂

Instead of or in addition to using the above described nitrogen compounds, use may be made according to the invention as polymerisation accelerators of compounds of the general formula $$R'-C_6H_4-SO_2-CHR'-OR'''$$

in which R' represents a hydrocarbon radical, which may if desired be substituted and R''' represents hydrogen, alkyl, aralkyl or acyl. It is particularly advantageous to use aryl-sulphone-carbinols of the general formula $$R'-C_6H_4-SO_2-CHR'-OH$$

for example benzene- or p-toluene-sulphone-carbinols of the formulae $$C_6H_5-SO_2-CH_2-OH$$

and $$CH_3-C_6H_4-SO_2-CH_2-OH$$

or mixtures thereof with the above described amines, for example benzene- or p-toluene-sulphone-methyl-(phenyl)-amine. Compounds can also be used in which the carbinol radical is substituted both by the aryl sulphone radical and also by other hydrocarbon residues, for example benzene-sulphone- or p-toluene-sulphone-methyl-carbinols of the formulae $$C_6H_5-SO_2-\underset{CH_3}{\overset{|}{C}H}-OH$$

and $$CH_3-C_6H_4-SO_2-\underset{CH_3}{\overset{|}{C}H}-OH$$

In addition to the polymerisation accelerators which are to be employed according to the invention, it is advantageous in many cases to use further polymerisation catalysts known per se, especially such as contain oxygen, such as oxygen, air, inorganic per-compounds, such as hydrogen peroxide or potassium persulphates, or organic per-compounds such as dibenzoyl peroxide, hydroxyheptyl peroxide, p-chlorbenzoyl peroxide, cyclohexanone peroxide, tertiary butylpermaleic acid, tertiary butylperphthalic acid or di-tertiary-butyl-di-perphthalate.

Finally the polymerisation can be influenced by irradiation with light of short wave length.

The most varied known polymerisation processes, for example block polymerisation, solution polymerisation, emulsion polymerisation or suspension polymerisation can be employed. Depending upon the process employed the monomeric compound to be polymerised is employed either as such or in the form of a solution in suitable solvents or in the form of emulsions.

In many cases it is advantageous to polymerise the compounds to be polymerised in the presence of a proportion of the already polymerised compound. For this purpose mixtures of polymer powders with liquid or dissolved monomers or liquid or dissolved partially polymerised compounds may be used. The liquid components of the mixture to be polymerised can also be a solution of another high molecular weight substance in the monomeric compound.

The polymerisation products produced according to the invention can be employed in the most varied fields and for the most varied purposes. Depending upon the intended purpose of use, the most varied additional substances may be mixed with the polymerisation products, prior to, during or after the polymerisation. These additional substances include fillers of the most varied kinds, such as carbon black, highly dispersed metal oxides, such as zinc oxide, silicon dioxide, aluminium dioxide and other finely dispersed or surface active substances, vulcanising agents, such as sulphur, mercapto benthiazole or urotropin, vulcanisation accelerators, dyestuffs, pigments, weighting agents, air-drying oils, softeners, stabilisers and capillary active substances. The process of the invention is not affected by the presence of inhibitors, for example hydroquinone or ascorbic acid.

The process of the invention is of value in the lacquer, adhesive and paint industries. A syrupy lacquer, which is to be polymerised by the process of the invention and consists of a solution of the polymer in the monomer with addition of a polymerisation catalyst, forms a film when painted or sprayed on to a surface which solidifies and hardens through very quickly, since the liqiud component is not only a solvent which evaporates, but a material which itself polymerises for the greatest part.

The process of the invention is also suitable for the production of trowelling masses, impregnating masses for materials of all kinds, for example fabrics, especially textiles, jointing masses, pore fillers, for the production of bodies or claddings which are resistant to corrosive or atmospheric influences, for electric insulations of all kinds, heat and sound insulating substances and modelling and impression receiving masses.

Moulded bodies of different kinds and of a nature varying from a rubber-like to a glassy character, can be produced according to the invention. The glassy polymerisation products are so perfect and dense that they can be regarded as almost ideal. Even when they have a considerable thickness and a relatively high strength, they give surfaces of fracture of extraordinary hardness which are conchoidal, have a glassy lustre and are completely free from pores.

Since the new polymerisation products are free from pores and stresses they can be employed with particular advantage for the production of articles in which optical clearness and transparency is required, such as safety glass, protective filters and spectacle lenses.

Moulded bodies can be produced according to the invention of the most varied forms, such as threads, films, tubes, hose, balls and bodies of complicated shapes.

The polymerisation products of the invention are of particular importance in the field of dental industry for the production of protheses, artificial teeth and tooth and root fillings. Moulded bodies of plastic have been made for this purpose for many years by carrying out the polymerisation in a mould which has the shape of the desired moulded body. This process is preferably carried out by filling into the mould a monomeric or only partially polymerised liquid in admixture with a polymer, especially a polymer corresponding to the compound to be polymerised, preferably in the form of a powder, and completing the polymerisation to form the finished moulded body in the mould. The contraction in volume on completing the polymerisation is reduced by the addition of a polymer and in this way a moulded body is obtained which is true to pattern. The nature of the mixture to be filled into the mould can be varied within wide limits in dependence upon the proportion in which the powder and liquid are mixed and on the additional substances which are co-employed, for example by using masses of the nature of a viscous liquid, or pasty mixtures or mixtures which may be regarded as moistened powders. The monomeric or partially polymerised liquid may contain a stabiliser, whilst the catalyst is added to the fully polymerised powder. When the two are mixed in the mould the catalyst comes into contact with the monomer and the desired polymerisation takes place on heating.

When the process of the invention is applied in this field, the polymerization can be carried out at such low temperature and so quickly that dental work can be carried out in the mouth itself.

When the process of the invention is carried out for this purpose it is advantageous to use starting materials for the polymerisation which consists, on the one hand, of the liquid or dissolved compound, which is to be polymerized, in monomeric or partially polymerised form, and on the other hand a polymer, preferably in powder form, which is stored separately until the polymerisation process. The liquid component can contain the polymerisation catalysts of the invention, whilst the powder component contains, if desired, the oxygen-containing polymerisation catalyst. The catalysts of the invention can also, however, be added to the powder component and surprisingly in many cases they can be added thereto in addition to the oxygen-containing catalyst. When such starting materials are used, palate plates, base plates, dental repair parts, gum coverings, bridges, crowns, teeth, tooth fillings and root fillings can for example be produced.

The process of the invention can be applied in a similar manner to other prothetic field, for example to the production of artificial eyes, facial plastics, artificial limbs and the like.

*Examples*

In order to estimate the effectiveness of the polymerisation accelerators proposed for use according to the invention, portions each consisting of 1 cc. of monomeric methacrylic acid methyl ester were stirred to form a paste with 3 gms. of a polymer of the same ester containing 4% of dibenzoyl peroxide and 2% of one of the polymerisation accelerators to be employed according to the invention. One portion was polymerised starting at 35° C. until it hardened, and another portion was polymerised starting at room temperature until it hardened.

The following polymerisation accelerators were employed:

1. $CH_3-C_6H_4-SO_2-CH_2-NH-C_6H_5$
2. $CH_3-C_6H_4-SO_2-CH_2-N(C_2H_5)-C_6H_5$
3. $(CH_3-C_6H_4-SO_2CH_2)_2NCH_3$
4. $(CH_3-C_6H_4-SO_2-CH_2)_2NC_2H_5$
5. $(C_6H_{13}-SO_2-CH_2)_2NCH_3$
6. $(C_8H_{17}-SO_2-CH_2)_2NCH_3$
7. $(CH_3-C_6H_4-SO_2-CH_2)_2NC_2H_4OH$
8. $(CH_3-C_6H_4-SO_2-CH_2)_2N-CH_2-$
   $CH_2-N(CH_2-SO_2-C_6H_4-CH_3)_2$
9. $CH_3C_6H_4-SO_2-CH_2-NH-CH_2-$
   $CH_2-NH-CH_2-SO_2-C_6H_4-CH_3$
10. $C_6H_5-SO_2-CH_2OH$
11. $CH_3-C_6H_4-SO_2-CH_2OH$
12. $CH_3-C_6H_4-SO_2-CH(OH)-CH_3$
13. $CH_3-C_6H_4-SO_2-CH(OH)-CH_2-CH_2-CH_3$
14. $CH_3C_6H_4-SO_2-CH(OH)-CH=CH-CH_3$
15. $p-Cl-C_6H_4-SO_2-CH_2OH$

The above polymerisation accelerators, most of which are new compounds, were produced by a modified process of Meyer, Journ. für praktische Chemie, vol. 63, page 167 (1901).

The results of polymerisation with the above accelerators may be seen from the following table:

| Polymerisation accelerator | Time of polymerisation in minutes— | |
|---|---|---|
| | starting at 35° C. | starting at Room Temperature |
| 1 | 13–14 | |
| 2 | 12–14 | |
| 3 | 7 | 23–25 |
| 4 | 5 | 10–12 |
| 5 | | 12–14 |
| 6 | | 12–15 |
| 7 | 5–6 | 14–15 |
| 8 | 10 | |
| 9 | 14–15 | |
| 10 | 5 | 12 |
| 11 | 5–6 | 12–14 |
| 12 | 10 | |
| 13 | 4 | 10–12 |
| 14 | 4–5 | |
| 15 | 7 | |

All products possess superior hardness and show no decoloration.

What we claim is:

1. Process for the production of polymerization products from polymerizable organic compounds having a terminal methylene group linked to a carbon atom, including molded bodies, which comprises effecting the polymerization in the presence of a sulfone polymerization accelerator of the general formula

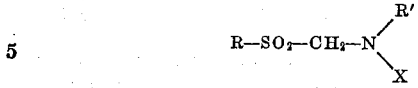

in which R is a member selected from the group consisting of alkyl, alkylaryl, and aryl radicals, R' is a member selected from the group consisting of H, R and hydroxyalkyl radicals, and X is a member selected from the group consisting of H, alkyl radicals, and the group $R-SO_2-CH_2-$.

2. Process according to claim 1 in which said polymerizable organic compound is an unsaturated hydrocarbon.

3. Process according to claim 1 in which said polymerizable organic compound is an allyl compound.

4. Process according to claim 1 in which the polymerization is effected in the presence of already polymerized portions of the compound to be polymerized.

5. Process according to claim 1 in which said polymerization is effected in the presence of a different high molecular compound being capable of swelling in the monomeric material being polymerized.

6. Process according to claim 1 in which said polymerization is initiated at a temperature below about 40° C.

7. Process according to claim 1 in which said polymerization is initiated at about room temperature.

8. Process according to claim 1 in which said polymerizable organic compound having a terminal methylene group linked to a carbon atom is vinyl chloride.

9. Process according to claim 1 in which said polymerizable organic compound having a terminal methylene group linked to a carbon contains an acrylic group.

10. Process according to claim 1 in which said polymerizable organic compound having a terminal methylene group linked to a carbon atom is styrene.

11. Process according to claim 1 in which said polymerization is effected in the presence of an oxygen containing polymerization catalyst selected from the group consisting of oxygen and peroxides.

12. Starting material particularly for the production of molded bodies such as dental protheses and tooth fillings, which comprises a polymerizable liquid organic compound having a terminal methylene group linked to a carbon atom in an incompletely polymerized condition, to be polymerized, and a powdery polymer of said compound to be polymerized, said polymer containing an oxygen-containing polymerization catalyst selected from the group consisting of oxygen and peroxides and a compound having the general formula

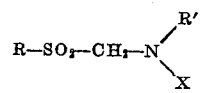

in which R is a member selected from the group consisting of alkyl, alkylaryl and aryl radicals, R' is a member selected from the group consisting of H, R and hydroxyalkyl radicals, and X is a member selected from the group consisting of H, alkyl radicals and the group $R-SO_2-CH_2-$.

13. A starting material for the production of molded bodies such as dental protheses and tooth fillings which comprises a mixture of a powdery polymer of a polymerizable organic compound having a terminal methylene group linked to a carbon atom and a compound having the general formula

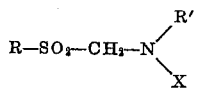

in which R is a member selected from the group consisting of alkyl, alkylaryl, and aryl radicals, R' is a member selected from the group consisting of H, R and hydroxyalkyl radicals, and X is a member selected from the group consisting of H, alkyl radicals, and the group R—SO₂—CH₂—.

14. Starting material according to claim 13, including a polymerization catalyst selected from the group consisting of oxygen and peroxides.

15. A starting material for the polymerization of molded bodies such as dental protheses and tooth fillings which comprises a mixture of a polmerizable liquid organic compound having a terminal methylene group linked to a carbon atom in an incompletely polymerized condition and a compound having the general formula

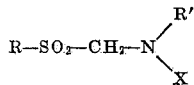

in which R is a member selected from the group consisting of alkyl, alkylaryl, and aryl radicals, R' is a member selected from the group consisting of H, R and hydroxyalkyl radicals, and X is a member selected from the group consisting of H, alkyl radicals, and the group R—SO₂—CH₂.

16. Starting material according to claim 15, including for admixture therewith a powdery polymer of the compound to be polymerized, said powdery polymer containing an oxygen-containing polymerization catalyst selected from the group consisting of oxygen and peroxides.

References Cited in the file of this patent

UNITED STATES PATENTS 2,558,139    Knock et al. _____ June 26, 1951